United States Patent [19]

Tagawa

[11] Patent Number: 5,315,891
[45] Date of Patent: May 31, 1994

[54] BICYCLE SPEED CHANGE OPERATION ASSEMBLY

[75] Inventor: Koichi Tagawa, Osaka, Japan

[73] Assignee: Maeda Industries, Ltd., Osaka, Japan

[21] Appl. No.: 910,169

[22] PCT Filed: Feb. 10, 1992

[86] PCT No.: PCT/JP92/00138

§ 371 Date: Jul. 15, 1992

§ 102(e) Date: Jul. 15, 1992

[87] PCT Pub. No.: WO92/14645

PCT Pub. Date: Sep. 3, 1992

[30] Foreign Application Priority Data

Feb. 13, 1991 [JP] Japan .................................. 3-42654

[51] Int. Cl.$^5$ ............................................. B62K 23/06
[52] U.S. Cl. .................................. 74/489; 74/502.2; 74/475; 74/505
[58] Field of Search ............... 74/475, 489, 502.2, 74/505

[56] References Cited

U.S. PATENT DOCUMENTS

| 4,352,303 | 10/1982 | Christner ...................... 74/505 X |
| 4,653,613 | 3/1987 | Blancas ........................... 74/489 X |
| 5,009,629 | 4/1991 | Tagawa ....................... 74/502.2 X |
| 5,052,242 | 10/1991 | Look et al. ...................... 74/502.2 |

FOREIGN PATENT DOCUMENTS

| 507737 | 12/1951 | Belgium ............................. 74/489 |
| 0371429 | 6/1990 | European Pat. Off. . |
| 423779 | 4/1991 | European Pat. Off. ......... 74/502.2 |
| 0485863 | 5/1992 | European Pat. Off. . |
| 540737 | 12/1931 | Fed. Rep. of Germany ........ 74/489 |
| 2710391 | 9/1978 | Fed. Rep. of Germany ........ 74/489 |
| 8536537 | 3/1986 | Fed. Rep. of Germany . |
| 9015515 | 3/1991 | Fed. Rep. of Germany . |
| 2285655 | 4/1976 | France . |
| 2563174 | 10/1985 | France . |
| 2657062 | 7/1991 | France . |
| 410248 | 3/1945 | Italy ..................................... 74/489 |
| 750478 | 6/1956 | United Kingdom .................. 74/489 |
| 891512 | 3/1962 | United Kingdom . |
| 1004357 | 9/1965 | United Kingdom .................. 74/489 |

Primary Examiner—Leslie A. Braun
Assistant Examiner—Ryan W. Massey
Attorney, Agent, or Firm—Michael D. Bednarek

[57] ABSTRACT

For the purpose of providing a bicycle speed change operation assembly capable of ensuring stable handlebar operation and immediate braking operation as well as remarkably improved riding safety during the speed change operation, the following technical means are provided: A bicycle speed change operation assembly according to the present invention comprises a cylindrical operation member (11) rotatably supported around a grip end portion of a handlebar (3), a speed change operation mechanism (12) provided in proximity of that grip end portion of the handlebar (3) and capable of winding and unwinding a speed control cable, and a transmission mechanism (13) provided between the cylindrical operation member (11) and the speed change operation mechanism (12) for driving this speed change operation mechanism (12) in response to the rotation of the cylindrical operation member (11), wherein the speed change operation mechanism (12) functions to wind or unwind the control cable in response to rotational reciprocation of said cylindrical operation member in one direction from a neutral rotational position.

11 Claims, 19 Drawing Sheets

BICYCLE SPEED CHANGE OPERATION ASSEMBLY

FIELD OF THE INVENTION

The present invention relates to a bicycle speed change operation assembly. More specifically the present invention relates to a bicycle speed change assembly which ensures stable handlebar operation as well as immediate braking operation during speed changing operation, and is applicable to a variety of handlebars including what is know as a flat handlebar.

BACKGROUND ART

A bicycle speed change assembly for sports type bicycles such as racing bikes has been commonly mounted on a bicycle frame member such as a down tube or a top tube. This location unavoidably requires that a cyclist must unhand, i.e., release the handlebar to achieve a speed change operation. It is only natural, therefore, that during a speed change operation a cyclist has no immediate access to a braking apparatus. In addition, the single-handed cycling unavoidably leads to an unstable handlebar operation.

On the other hand speed change operation is required in general when there is a change in road condition, for example, from a flat road to a slope, or vice versa. In such occasions, however, brake operation is also often called for since such change in road condition often leads to less stable riding.

To alleviate this problem a conventional speed change operation assembly has been mounted, for example, on a handle grip portion or in proximity with a brake lever in an attempt that the handlebar or the brake may be accessed as quickly as possible from the speed change operation lever. Indeed this has been the only way to improve riding safety during a speed changing operation.

No matter how close the speed change operation lever is located to the brake lever or handlebar grip portion, the speed change operation does require the cyclist's hand to leave the handlebar or the brake lever, and as a result single-handed cycling is unavoidable. Disturbed access to a brake is likewise unavoidable.

In an attempt to solve this problem a proposal has been made for example as in the Japanese Patent Application Laid-open No. Hei-2-147487 which discloses a speed change operation assembly wherein a speed change operation lever extends out of a brake bracket.

However, the speed change operation assembly disclosed thereinabove has a problem of limited application; it is only applicable to what is known as a drop-type handlebar, and therefore bicycles mounted with other types of handlebars are out of the scope of application.

Furthermore, that particular speed change operation assembly disclosed thereinabove requires that for speed change operation either a thumb or a forefinger must be released from a handlebar grip. Therefore, it does not provide a cyclist with immediate access to a braking apparatus, or it does not solve, either, the problem of disturbed handling stability.

DISCLOSURE OF THE INVENTION

It is therefore a purpose of the present invention to provide a bicycle speed change operation assembly wherein a speed change operation can be achieved without disturbing stable handlebar operation. Another purpose of the present invention is to provide a bicycle speed change operation assembly wherein a speed change operation can be achieved without disturbing immediate access to a braking apparatus and thereby greatly improving riding safety. Still another purpose of the present invention is to provide a bicycle speed change operation assembly which is applicable to a variety of handlebars including a flat handlebars.

The present invention comprises a bicycle speed change operation assembly comprising a cylindrical operation member rotatably supported around a grip end portion of a handlebar, a speed change operation mechanism provided in proximity of that grip end portion of the handlebar and capable of winding and unwinding a speed control cable, and a transmission mechanism provided between that cylindrical operation member and the speed change operation mechanism for driving the speed change operation mechanism in response to the rotation of that cylindrical operation member, wherein the speed change operation mechanism functions to wind or unwind the control cable in response to rotational reciprocation of the cylindrical operation member in one direction from a neutral rotational position.

In accordance with another aspect of the present invention the speed change operation mechanism may further comprise a shaft member provided in proximity of the grip end portion, and a cable reel rotatably mounted around the shaft member and linked via said transmission mechanism with the cylindrical operation member; wherein the cylindrical operation member is spring-urged toward the neutral rotational position which provides a commencing point at the time of rotation in cable winding and unwinding directions; and the transmission mechanism functions to rotate the cable reel with the cylindrical operation member at the time of rotating the cylindrical operation member in the cable winding or unwinding direction from the neutral position but to disconnect rotational coupling relation between the cylindrical operation member and the cable reel when the cylindrical operation member is rotated back to the neutral position.

In accordance with another aspect of the present invention the cylindrical operation member may be provided with a finger engaging bulge projecting radially outward for engagement with a cyclist's finger.

Other purposes, characteristics and advantages of the present invention will be further detailed in the later description of the preferred embodiments hereinafter by referring to the following attached Figures.

BRIEF DESCRIPTION OF THE DRAWINGS

FIG. 1 is a plan view of a speed change operation assembly thereof.

FIG. 2 is a cross-sectional view taken on the line II—II in FIG. 1.

FIG. 3 is a cross-sectional view taken on the line III—III in FIG. 1.

FIG. 4 is a cross-sectional view taken on the line IV—IV in FIG. 2.

FIG. 5 is a cross-sectional view taken on the line V—V in FIG. 4.

FIG. 6 is a cross-sectional view taken on the line VI—VI in FIG. 4.

FIG. 7 is a fragmentary cross-sectional view taken on the line VII—VII in FIG. 4.

FIG. 8 is a side view of an engagement member.

FIG. 9 is a front view of the engagement member.

FIG. 10 is to describe a function of the speed change operation assembly according to the first embodiment, showing a cross-sectional view taken on the line VII—VII in FIG. 4.

FIG. 11 is to describe a function of the speed change operation assembly according to the first embodiment, showing a fragmentary cross-sectional view taken on the line VII—VII in FIG. 4.

FIG. 12 is to describe a function of the speed change operation assembly according to the first embodiment, showing a fragmentary cross-sectional view taken on the line VII—VII in FIG. 4.

FIG. 13 is to describe a function of the speed change operation assembly according to the first embodiment, showing a fragmentary cross-sectional view taken on the line XIII—XIII in FIG. 4.

FIG. 14 is to describe a function of the speed change operation assembly according to the first embodiment, showing a fragmentary cross-sectional view taken on the line XIII—XIII in FIG. 4.

FIG. 15 is to describe a function of the speed change operation assembly according to the first embodiment, showing a fragmentary cross-sectional view taken on the line XIII—XIII in FIG. 4.

FIG. 16 is a plan view of the click plate of the click mechanism according to the first embodiment.

FIG. 17 is a plan view of the ball holder of the click mechanism according to the first embodiment.

FIG. 18 is a cross-sectional view taken on the line XVIII—XVIII in FIG. 17.

FIG. 19 compares to FIG. 4 in the first embodiment, showing the second embodiment.

FIG. 20 is a cross-sectional view taken on the line XX—XX in FIG. 19.

FIG. 21 is a cross-sectional view taken on the line XXI—XXI in FIG. 19.

BEST MODES FOR CARRYING OUT THE INVENTION

The best modes for carrying out the present invention will now be described in detail referring to FIGS. 1 through 21.

FIGS. 1 through 18 show a first embodiment of the present invention.

Figure 1:
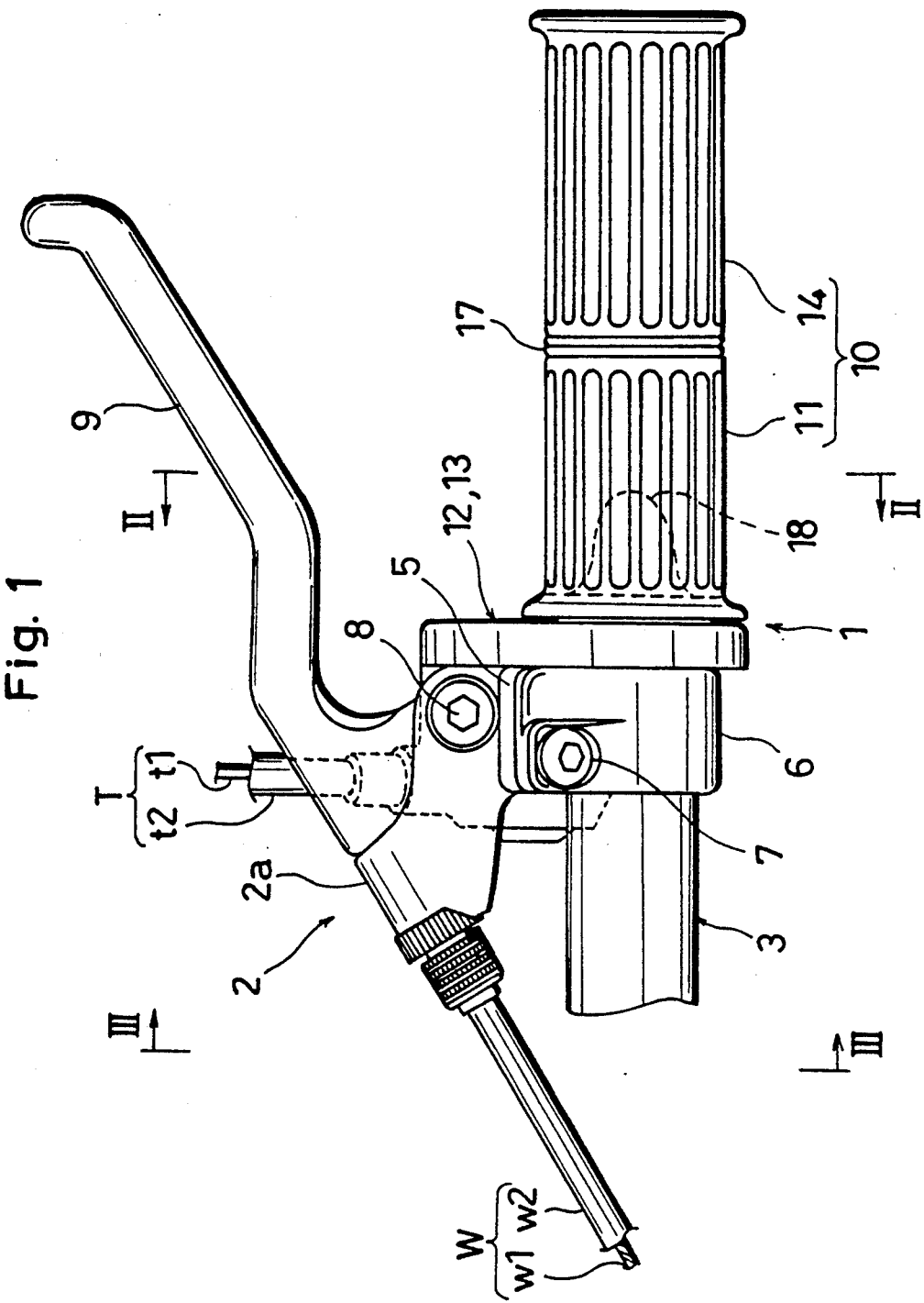
FIGS. 1 to 18 show a first embodiment of the present invention.
Figure 2:
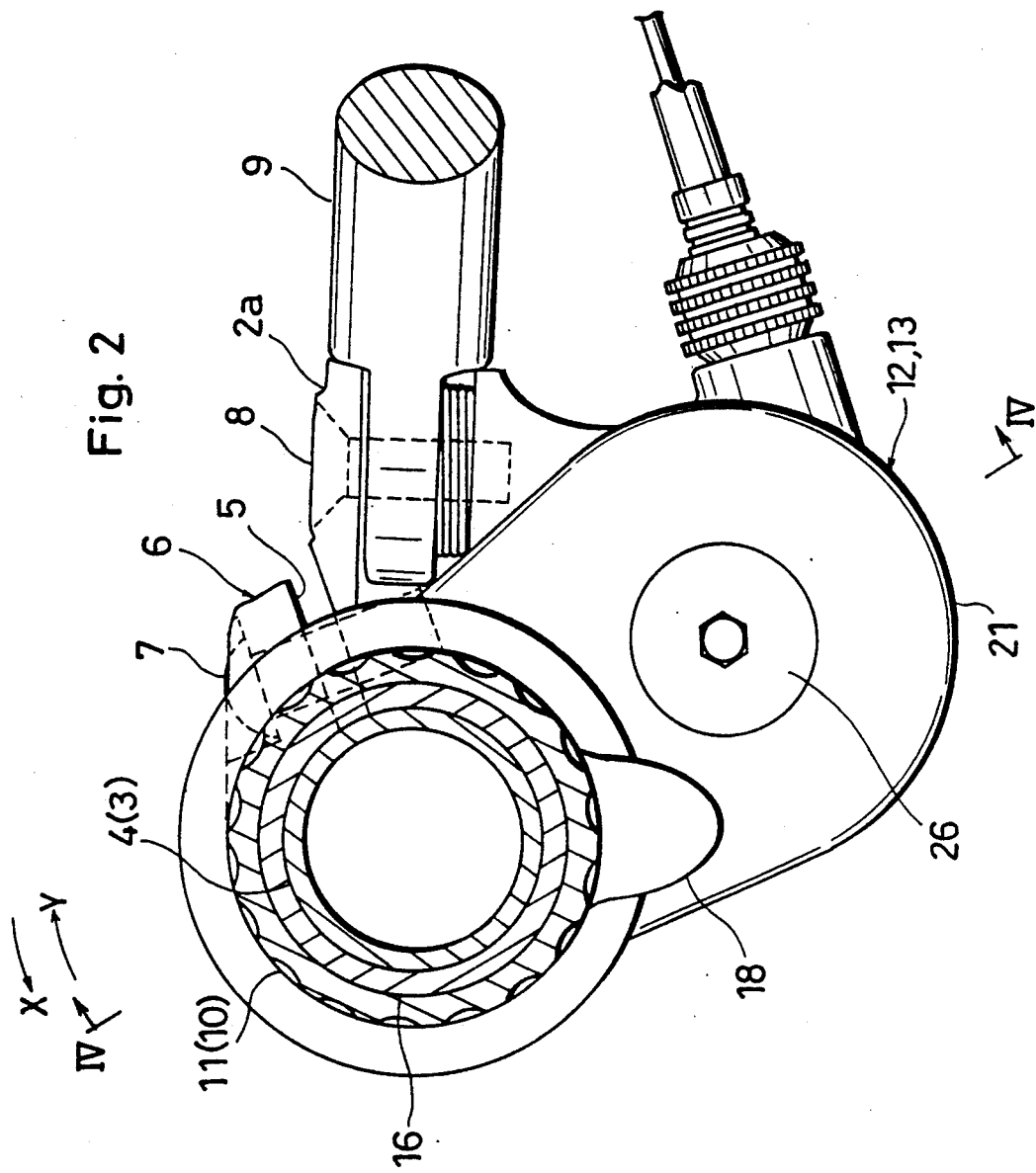
Figure 3:
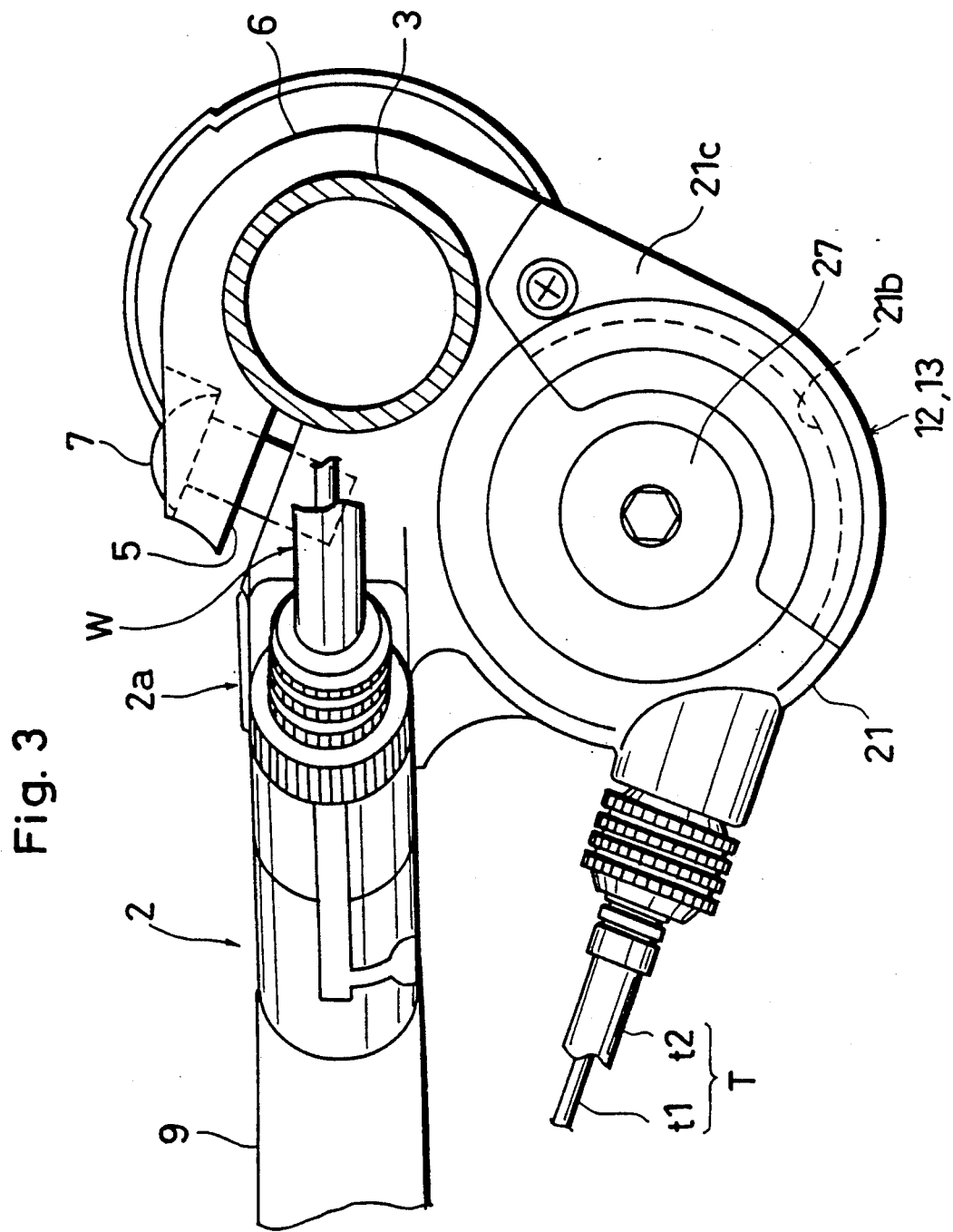

As shown in FIGS. 1 through 3 the speed change operation assembly 1 according to this embodiment is integrated with a brake lever assembly 2 and a handle grip 10 provided at a grip end portion 4 of a handlebar 3.

Either at a base end portion of a brake bracket 2a of the brake lever assembly 2 or at a laterally inward position of the bicycle handle grip 10, there is provided a cylindrical mount 6, which has a slit 5 running axially through its cylindrical wall. This cylindrical mount 6 is fitted around the handlebar 3 laterally inwardly of the grip portion 4, and is penetrated by a fitting screw 7 across the slit 5. This screw causes the inner diameter of the cylindrical mount 6 to shrink elastically to fix the brake bracket 2a and the speed change operation assembly 1 on the handlebar 3.

The brake lever assembly 2 according to this embodiment comprises, in addition to the brake bracket 2a projecting out of the handlebar 3 forwardly of the bicycle, a brake lever 9 whose base end portion is pivotally connected to a lever shaft 8 located within the brake bracket 2a while the other end of the brake lever extends forwardly of the handle grip 10. An inner wire w1 and a sheathing outer wire w2 constitute a double brake cable W. The outer wire w2 is fastened to the brake bracket 2a. The inner wire w1 is introduced into the inner space of the brake bracket 2a and is fastened to the brake lever 9.

The speed change operation assembly 1 according to this embodiment is pivotally fitted around the grip portion 4 of the handlebar 3 at a position laterally outwardly of the cylindrical mount 6 fitted on the handlebar 3. This speed change operation assembly 1 comprises a cylindrical operation member 11 which also serves a part of the handle grip 10, a speed change operation mechanism 12 mounted forwardly downwardly of the cylindrical mount 6, and a transmission mechanism 13 which is provided between the cylindrical operation member 11 and the speed change operation mechanism 12 to transmit the operational rotation of the cylindrical operation member 11 to the speed change operation mechanism 12.

As shown in FIGS. 1 through 4 the cylindrical operation member 11 according to this embodiment is supported around the grip portion 4 of the handlebar 3, and constitutes the handle grip 10 together with a cylindrical grip member 14.

Figure 4:
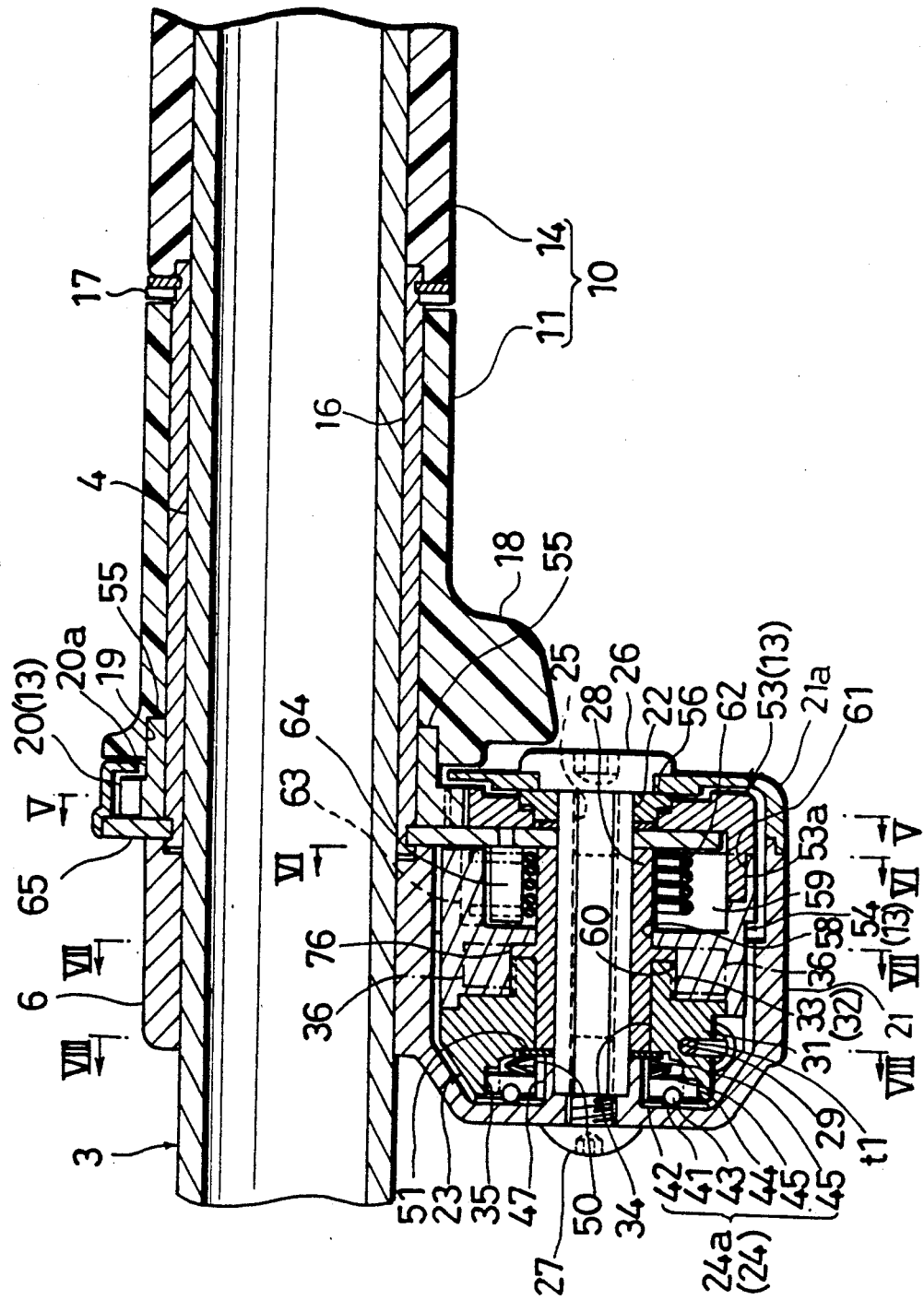

As shown in FIGS. 2 and 4 the cylindrical operation member 11 is rotatably fitted around the grip portion 4 of the handlebar 3 via a cylindrical sleeve 16. To prevent the operation member 11 from slipping off axially outward, the outer end portion of the sleeve 16 is fitted with a stop ring 17.

The cylindrical operation member 11 is formed with a finger engaging bulge 18 projecting radially downward for engagement with a cyclist's finger to help rotate the cylindrical operation member 11.

As shown in FIG. 4 the cylindrical operation member 11 has a splined inner circumferential wall 19 for engagement with a boss 20a of a drive gear 20 which is included in the transmission mechanism 13. Thus, the cylindrical operation member 11 is non-rotatable relative to the drive gear.

Below the brake bracket 2a, the speed change operation mechanism 12 and the transmission mechanism 13 are housed in a cylindrical housing 21 which is formed integrally with the brake bracket 2a and the mount 6. As shown in FIG. 4 the cylindrical housing 21 has an outer end opening which is normally closed by a lid 21a fastened by a bolt 26. Further, as shown in FIG. 3, an inner end of the housing is formed with a window 21b through which a speed control cable T is introduced therein. This window 21b is enclosed by a lid 21c.

As shown in FIG. 4 the cylindrical housing 21 accommodates a shaft member 22 supported substantially in parallel to the axis of the handlebar 3, a cable reel 23 is rotatably fitted around this shaft member 22 and is connected via the transmission mechanism 13 with the cylindrical operation member 11, and a retainer mechanism 24 for holding the cable reel 23 against the shaft member 22 at its predetermined or optical rotational position.

Figure 5:
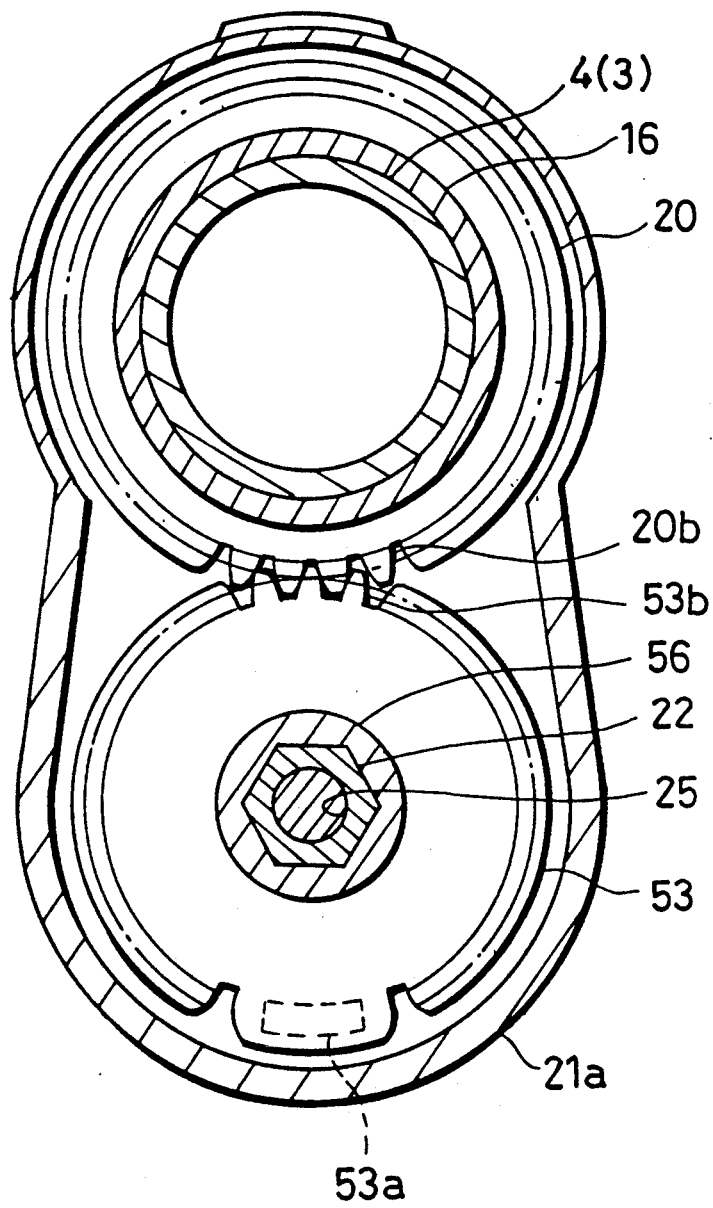

As shown in FIGS. 4 and 5 the shaft member 22, which is formed in a hexagonal column having a shaft hole 25, is fixed to the cylindrical housing 21 by two bolts 26, 27 to prevent rotation of the shaft member 22 relative to the cylindrical housing 21.

Around the shaft member 22 a substantially cylindrical shaft sleeve member 28 is non-rotatably fitted. The cable reel 23 is rotatably supported on this shaft sleeve member 28 closer to the axially inner end thereof. It should be appreciated here that, in the following description, the axially outward direction of the shaft member 22 refers to the laterally outward direction of the bicycle.

As shown in FIGS. 4, 13, 14 and 15 the cable reel 23 comprises a cylindrical reel portion 31, ratchet roller portion 33 and a retainer mechanism housing portion 35. The cylindrical reel portion 31 has a cable winding groove 29 which leads to a nipple holding portion 30. The ratchet roller portion 33 is provided axially outwardly of the reel portion 31, and has a plurality of ratchet teeth 32 (see FIG. 7). The retainer mechanism housing portion 35 is formed by enlarging a shaft hole 34 at an axially inner portion of the reel portion 31.

The shaft hole 34 is rotatably fitted on the shaft sleeve member 28, while the retainer mechanism housing portion 35 encases the retainer mechanism 24 to be detailed later.

Figure 7:
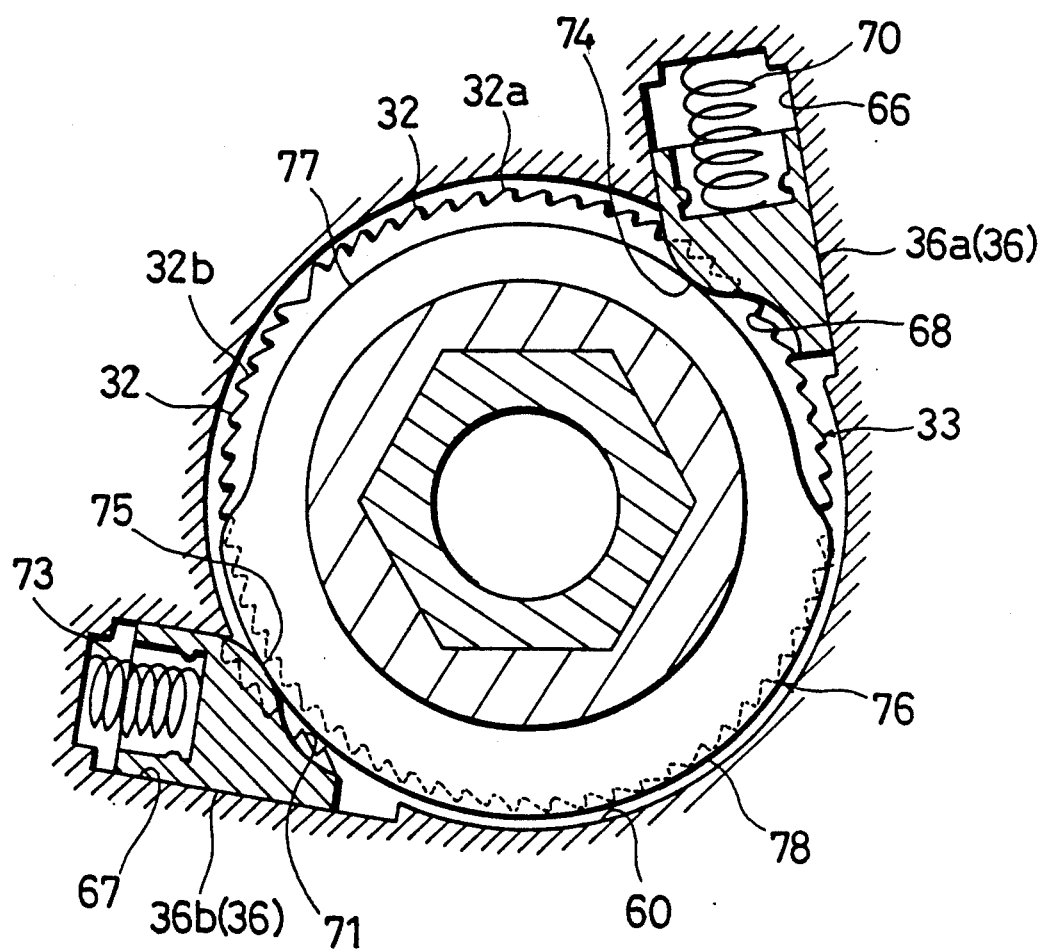
Figure 8:
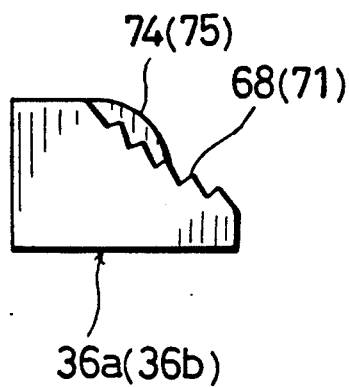
Figure 9:
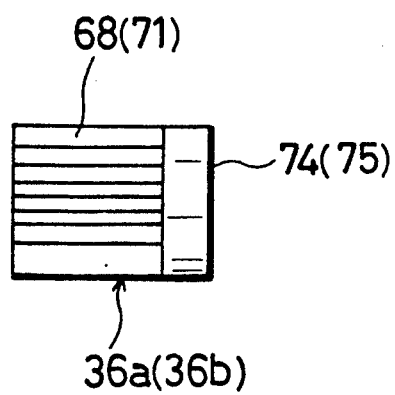

As shown in FIG. 7 the ratchet teeth 32 of the ratchet roller portion 33 are provided in a symmetrical layout to form a pair of ratchet teeth rows 32a, 32b each extending substantially through 180° angle. The two ratchet teeth rows 32a, 32b are opposite in teeth orientation and engageable with counter members 36 of the transmission mechanism 13 (to be detailed later) to rotate the cable reel 23.

Figure 13:
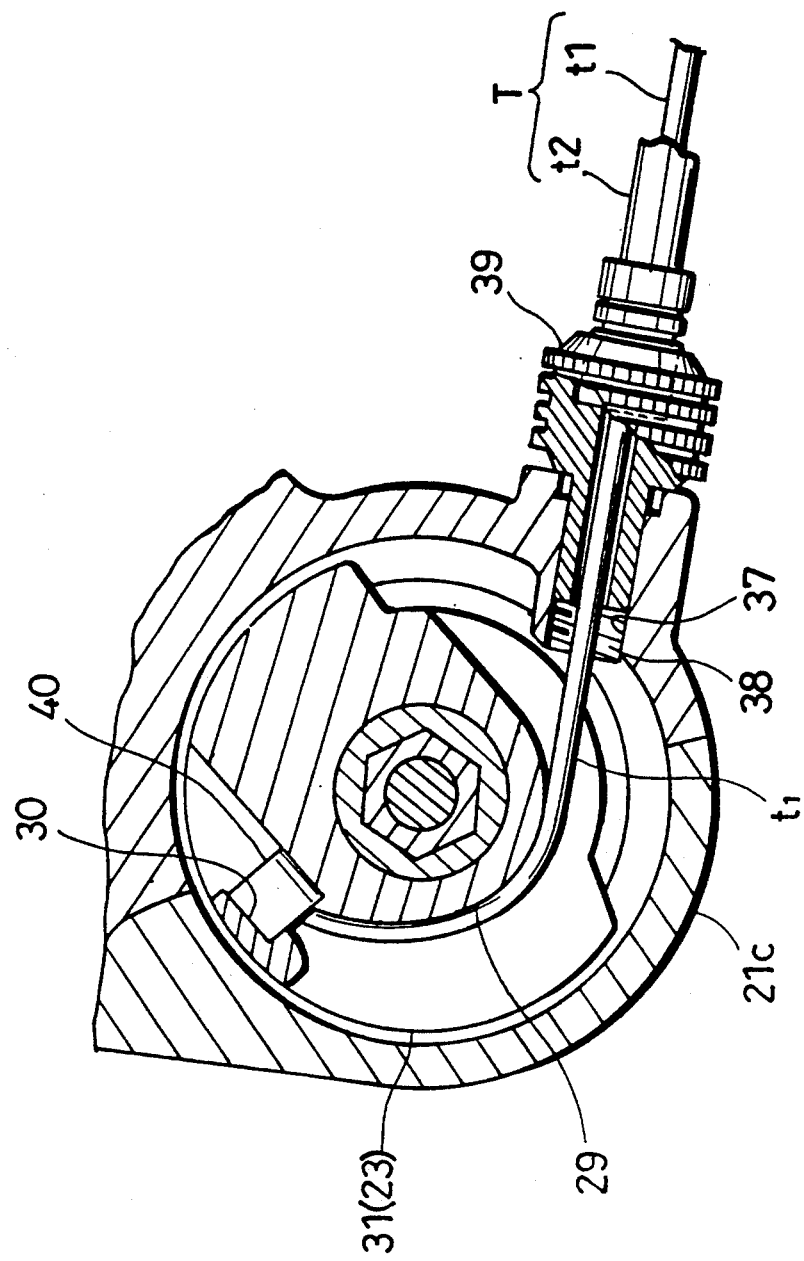

As shown in FIG. 13 the cylindrical housing is formed with a cable hole 37 radially outwardly of the reel portion 31 of the cable reel 23. The cable hole 37 introduces an inner cable t1 of the speed control cable T into the cylindrical housing 21 for winding and unwinding by the cable reel 23. The inner cable t1 extends through a sheathing outer cable t2 fitted with an adjusting screw 39. The cable hole 37 has internal threads 38. The adjusting screw 39 engages with the threads 38, fastening an end portion of the outer cable t2 to the cylindrical housing 21.

The inner cable t1 extends beyond the adjusting screw 39 into the cylindrical housing 21 where it is laid along the cable winding groove 29 of the reel portion 31. The inner cable has an end nipple 40 fastened to a nipple holding portion 30 of the cable reel 23.

Figure 14:
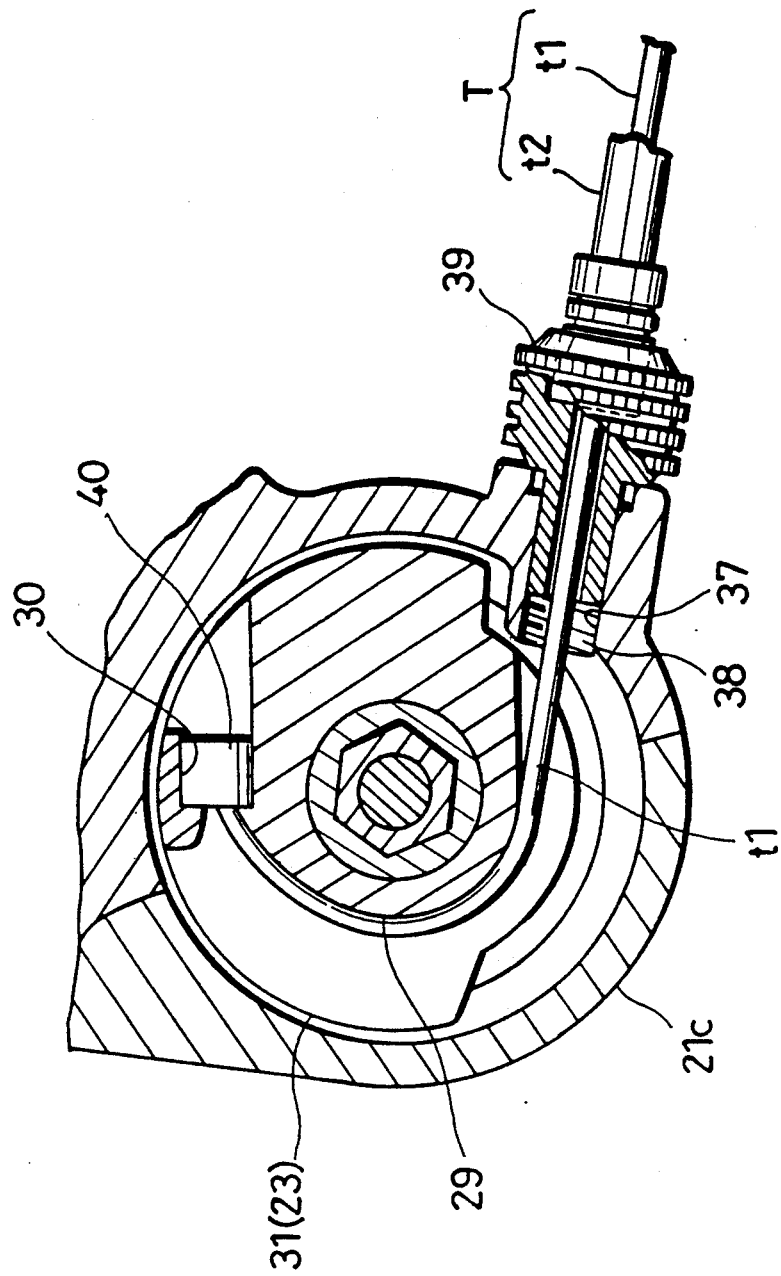
Figure 15:
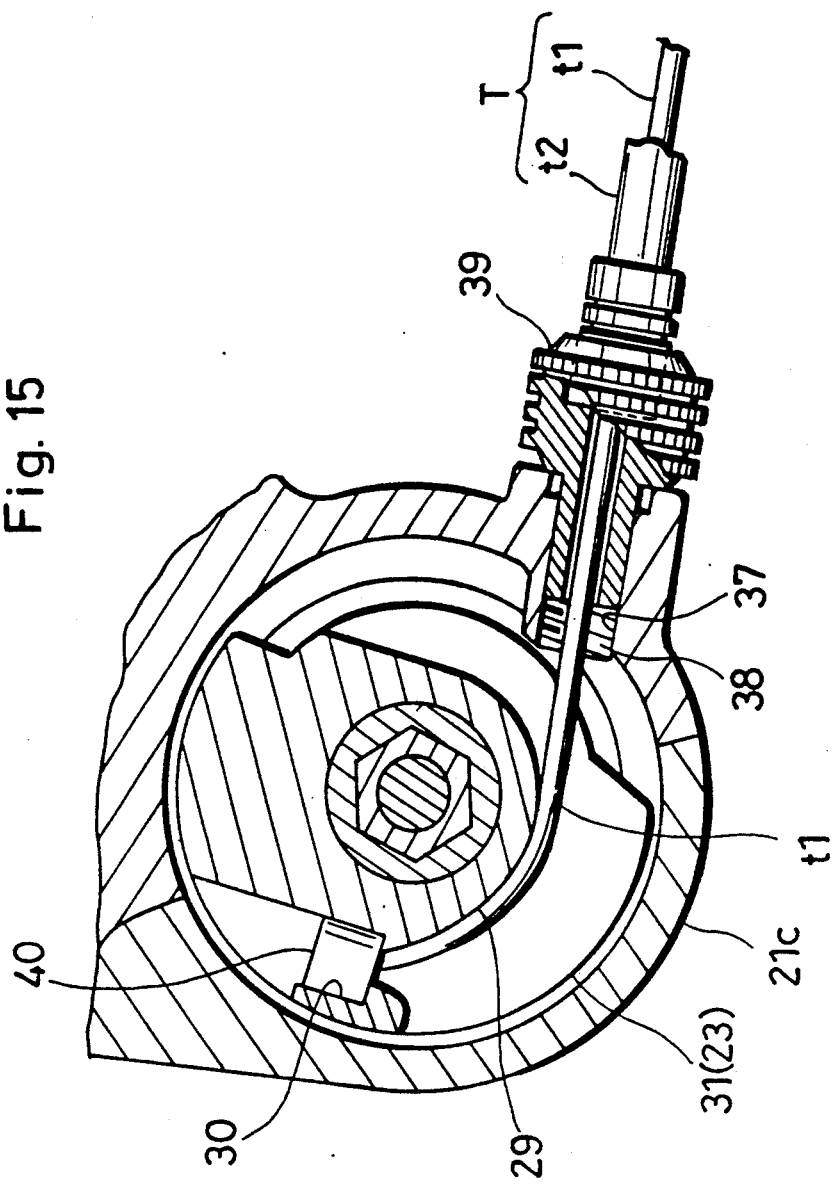

With the arrangement described hereinabove, when the cable reel 23 is rotated by the transmission mechanism 13, the inner cable t1 fastened to the reel portion 31 is moved relative to the outer cable t2 which is fastened to the cylindrical housing 21, as shown in FIGS. 13 through 15. This relative movement between the inner cable t1 and the outer cable t2 causes a derailleur to perform a speed change operation.

In this embodiment a click mechanism 24a is used as the retainer mechanism 24.

As shown in FIGS. 4, 16, 17, and 18 this click mechanism 24a includes a click plate 42 having a plurality of angularly spaced engaging recesses 41 centering around the shaft member 22, a ball holder 44 for retaining steel balls 43, and a pair of disk springs 45 for pressing the ball holder 44 against the click plate 42.

Figure 16:
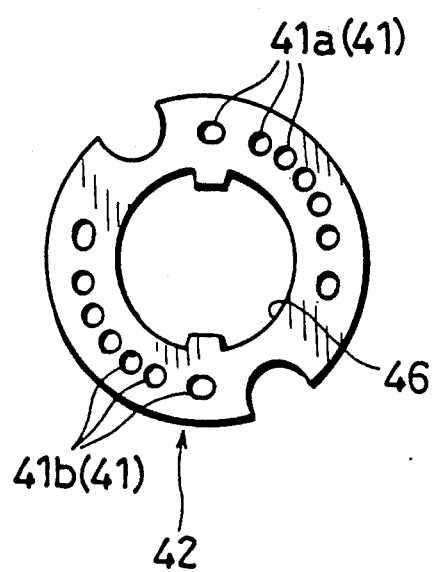

As shown in FIG. 16 the click plate 42 is substantially formed in a doughnut-shaped disk which has a center hole 46 fixedly fitted to an internal boss portion 47 of the cylindrical housing 21. The boss portion 47 projects axially from a center portion of the inner side wall of the cylindrical housing 21. The engaging recesses 41 are provided in two different groups 41a, 41b at diametrically opposite positions of the click plate 42.

The ball holder 44 retains steel balls 43 against the click plate 42, as shown in FIG. 4.

Figure 17:
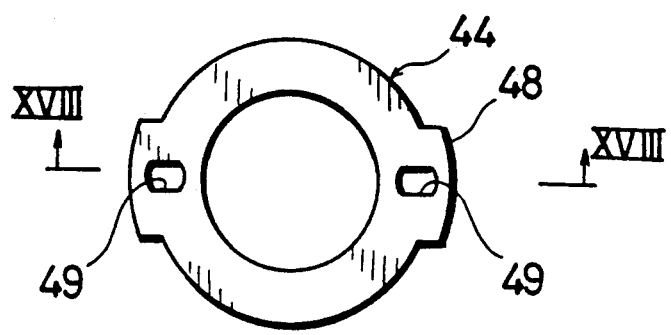
Figure 18:
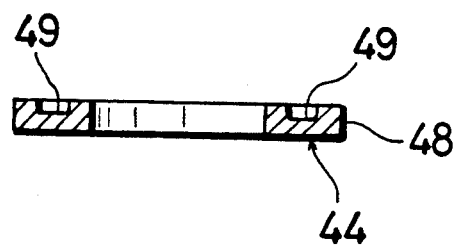

As shown in FIGS. 17 and 18 the ball holder 44 is also a doughnut-shaped member rotatably fitted around the internal boss portion 47 of the cylindrical housing 21. The ball holder has projections 48 fixedly fitted in the retainer mechanism housing portion 35 of the cable reel 23.

The ball holder 44 is provided with a diametrically opposite pair of ball retaining recesses 49 of a predetermined depth in corresponding relation to the groups 41a, 41b of engaging recesses 41 formed on the click plate 42. Each ball retaining recess 49 retains a corresponding one of the steel balls 43.

Further, as shown in FIG. 4, the pair of disk springs 45 are provided for elastically urging the ball holder 44 against the click plate 42. Each of the disk springs 45 has a center hole 50 rotatably fitted around the internal boss 47.

Axially outwardly of the disk springs, there is provided a bearing ring 51 for supporting the disk springs 45. This bearing ring 51 is clamped between the shaft member 28 and the boss 47.

In the click mechanism 24a the steel balls 43 are held movable with the cable reel 23 while elastically contacting the click plate 42 which is fixed to the cylindrical housing 21. Thus, when the cable reel is rotated, the steel balls 43 successively engage the engaging recesses 41 of the click plate 42, thereby holding the cable reel 23 at any one of stepwise rotational positions relative to the cylindrical housing 21.

Turning now to FIG. 4 again, the transmission mechanism 13 according to this embodiment comprises, in addition to the drive gear 20, a driven gear 53 rotatably mounted around the shaft member 22 of the cylindrical housing 21 to be driven by the drive gear 20, and a rotational coupling member 54 rotated by this driven gear 53.

As shown in FIGS. 4 and 5, the drive gear 20 is rotatably mounted on the sleeve 16 axially inwardly of the cylindrical operation member 11. The drive gear 20 is rotatable with the cylindrical operation member 11 since the drive gear has a projecting splined portion 55 extending axially of the boss 20a for engagement with the splined inner circumferential wall 19 of the cylindrical operation member 11.

The driven gear 53, as shown in FIGS. 4 and 5, has teeth 53b engaging the teeth 20b of the drive gear 20. The driven gear 53 is rotatably supported around a collar 56 fitted around the shaft member 22, and is located inwardly of the lid member 21a. At a diametrically opposite location of the engagement point between the drive and driven gears 20 and 53, there is formed an engaging portion 53a extending axially inward substantially in parallel to the shaft member 22 to engage and drive the rotational coupling member 54.

The rotational coupling member 54 according to this embodiment is substantially formed in a cylindrical shape, and is supported rotatably around the shaft member 28. The rotational coupling member 54 includes a shaft hole 58 for rotatably fitting on the shaft member 28. The coupling member 54 defines a spring housing space 59 on the axially outer side of the shaft hole 58, and a roller housing space 60 on the axially inner side of the shaft hole. On a circumferential wall of this spring housing space 59 there is formed an engaging groove 61 for engagement with the engaging portion 57 of the driven gear.

Figure 6:
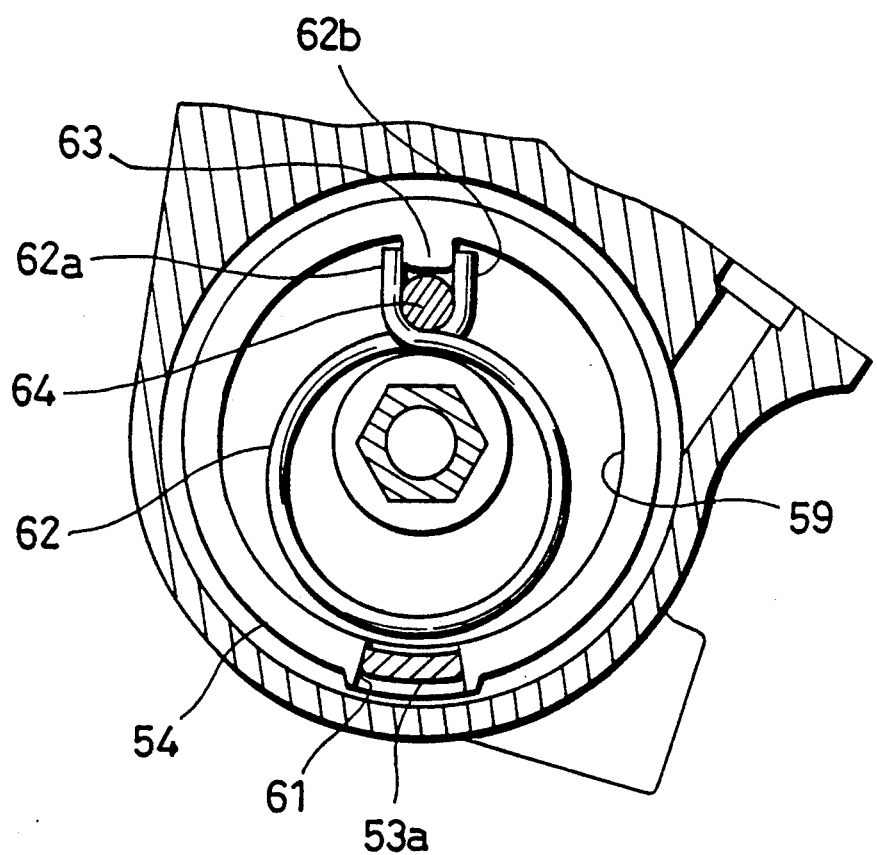

The spring housing space 59 accommodates a coil spring 62. The circumferential wall of the spring housing space 59 is provided with a sprint stopper 63, as shown in FIG. 6. The free end portions 62a, 62b of the coil spring 62 are made to engage this spring stopper 63 on both sides thereof. Also interposed between the free end portions 62a, 62b is a spring stopper pin 64 fixed to a partition plate 65 which bridges between the handlebar 3 and the shaft member 22.

With the above-mentioned arrangement the rotational coupling member 54 is urged toward a neutral rotational position where winding and unwinding of the cable is to commence. Accordingly, the cylindrical operation member 11 which is operatively connected to the coupling member 54 is also urged toward a neutral rotational position where winding and unwinding of the cable is to commence.

According to this arrangement, when the cylindrical operation member 11 is released after it is turned in a cable winding direction (FIG. 2, Arrow X) or a cable unwinding direction (FIG. 2, Arrow Y), it automatically turns back to the neutral position.

Turning to FIG. 4, the roller housing space 60 accommodates the ratchet roller portion 33 of the cable reel 23. The transmission mechanism 13 according to this embodiment is configured so that when the cylindrical operation member 11 is turned from the neutral operational position in the cable winding or unwinding direction, the cable reel 23 would rotate with the cylindrical operation member 11, whereas when the cylindrical operation member 11 turns back to the neutral position, this rotational coupling relation would be disconnected.

Turning now to FIGS. 7 through 12, the two ratchet teeth rows 32a, 32b of the ratchet roller portion 33 are opposite in teeth orientation, as previously described. On the other hand, the circumferential wall of the roller housing space 60 is provided with a diametrically opposite pair of cylindrical holding spaces 66, 67. In one space 66 there is slidably mounted an engagement member 36a which is urged by a spring 70 toward the ratchet roller portion 33 and has a plurality of engaging teeth 68 for engagement with one ratchet teeth row 32a at the time of rotating the cylindrical operation member 11 in one direction (FIG. 2, Arrow X). Likewise, in the other space 67 there is also slidably mounted an engagement member 36b which is urged by a spring 73 toward the ratchet roller portion 33 and has a plurality of engaging teeth 71 for engagement with the other ratchet teeth row 32a at the time of rotating the cylindrical operation member 11 in the opposite direction (FIG. 2, Arrow Y). In addition, as clearly shown in FIGS. 7 through 9 each engagement member 36a, 36b has a respective bulge 74, 75 which projects beyond the corresponding engaging teeth 68, 71 toward the ratchet roller portion 33.

Turning now to FIG. 4, at an axially outside location of the ratchet roller portion 33 there is provided a ratchet control plate 76 formed integrally with the shaft member 28. This ratchet control plate 76, as shown in FIG. 7, includes a non-pressing portion 77 which is a substantial semicircle radially smaller than the teeth root circle of the ratchet teeth 32, and a pressing portion 78 which is also a substantial semicircle radially as equal as the teeth top circle of the ratchet teeth 32.

Figure 10:
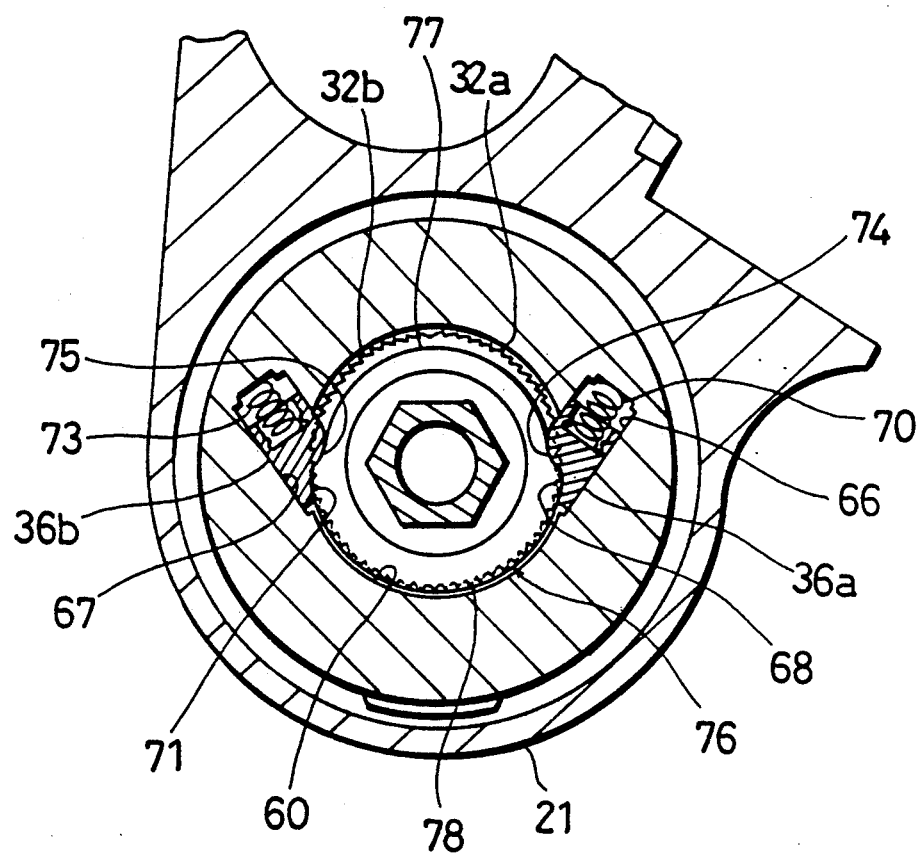
Figure 11:
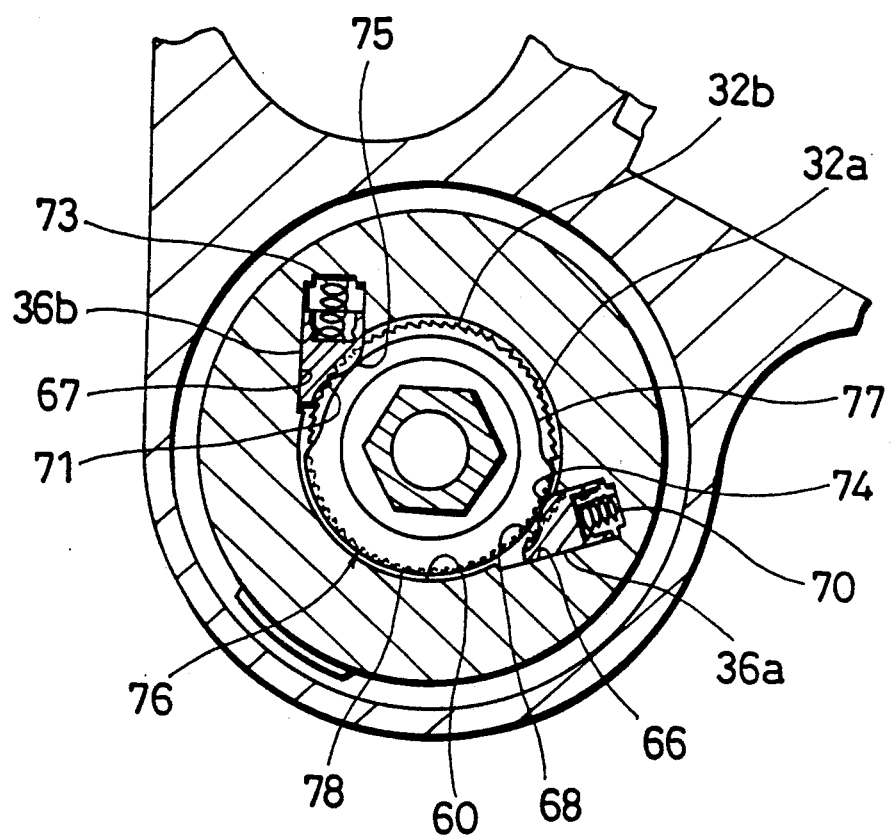

As shown in FIG. 10 the arrangement of the ratchet control plate 76 is such that the bulges 74, 75 of the respective engagement members 36a, 36b would face the non-pressing portion 77 when the cylindrical operation member 11 is located at the neutral position. From this position, when the cylindrical operation member 11 is turned in the direction of Arrow X in FIG. 2, for example, the result is as shown in FIG. 11: The bulge 74 of the engaging member 36a (the member at the right-hand side in the FIG. 11) is contacted by the pressing portion 78 to disengage the engagement member 36a from the ratchet roller 33, whereas the other engagement member 36b (left in the FIG. 11) is still engaged with the ratchet roller 33. In other words, the rotational coupling made by the engagement member 36b (left in FIG. 11) causes the cable reel 23 to be turned with the cylindrical operation member 11. However, when the cylindrical operation member 11 is turned back to the neutral position, the engagement teeth 71 of the engagement member 36b will just ride over the ratchet teeth 32 of the ratchet roller portion 33, whereas the bulge 74 of the engagement member 36a (right in the FIG. 11) is still contacted by the pressing portion 78 of the ratchet control plate 76, so that the cable reel 23 will not turn with the cylindrical operation member 11.

Figure 12:
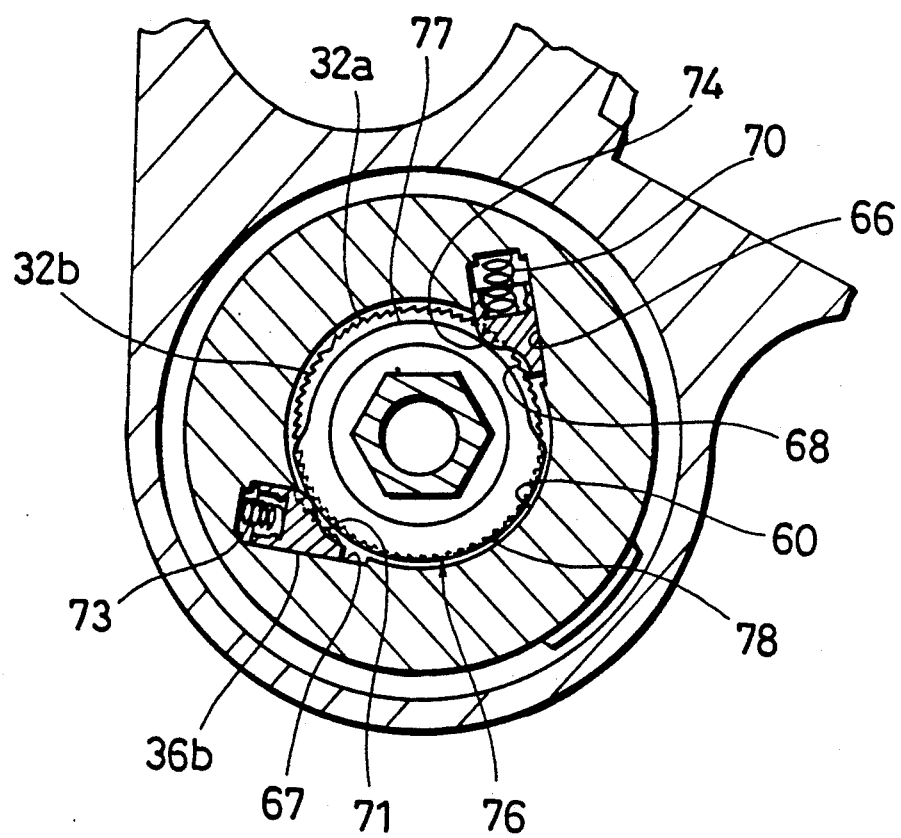

On the other hand, when the cylindrical operation member 11 is turned otherwise (in the direction of Arrow Y in FIG. 2), the result is as shown in FIG. 12: The engagement established by the engagement member 36a (right) will cause the cable reel 23 to turn with the cylindrical operation member 11, but when the cylindrical operation member 11 is turned back to the neutral rotational position, the cable reel 23 will not turn therewith.

In summary, the cable reel 23 will only rotate with the cylindrical operation member 11 when the cylindrical operation member 11 is turned from the neutral rotational position in the cable winding direction (Arrow X in FIG. 2) or the cable unwinding direction (Arrow Y in FIG. 2), but will not rotate with the cylindrical operation member 11 when it is turned back to the neutral rotational position by the urge of the spring 62.

With the arrangement described hereinabove when the cylindrical operation member 11 is turned, the cable reel member 23 will rotate to cause the inner cable t1 to move relative to the outer cable t2. This relative axial movement between the inner cable t1 and the outer cable t2 can cause a derailleur (not shown) to perform a speed change operation.

In the speed change operation assembly 1 according to this embodiment structured as hereinabove, the cylindrical operational member 11 is urged by the spring 62 so that it would automatically turn back to the neutral rotational position as the commencing point of the cable winding and unwinding. As a result, a rotational operation of the cylindrical operational member 11 can always be started at the same rotational position. In addition, when the cylindrical operation member 11 is turned back to the neutral rotational position, it does not cause the cable reel 23 to rotate with it, which means that returning movement of the cylindrical operation member 11 will not cause the inner cable t1 of the control cable T to be rewound after release or unwound after winding. In other words repetitive reciprocal rotation of the cylindrical operation member 11 can cause the cable reel 23 to rotate intermittently step by step. Furthermore, a speed change operation may be achieved without unhanding the cylindrical operation member 11 since the rotational operation can always be commenced at the same rotational position. This makes a speed change operation easier and improves greatly the riding safety during a speed change operation.

Further, according to the present invention, a speed change operation can be performed by operating the cylindrical operation member 11 which constitutes the handle grip. This allows the cyclist to deal with situations where an urgent braking operation is necessitated. The cyclist can swiftly apply brake even during a speed changing operation, which contributes greatly to an improved safety.

Still further, the speed changing operation has been significantly facilitated in this embodiment by the inclusion of the built-in click mechanism 24 for holding the cable reel 23 stepwise.

Moreover, it is possible to locate the speed change operation mechanism 12 apart from the cylindrical operation member 11 which is a constituent of the handle grip 10. For example, it may be mounted at a location which would not disturb handle operation such as below the handlebar or handle grip as shown in the embodiment. This contributes to improvement of operability and appearance while enabling reduction of the assembly size.

Moreover, since an amount of one reciprocal rotation of the cylindrical operation member 11 can be rendered small, the cyclist would not need to change his/her grip position on the cylindrical operation member 11 even when a speed change operation calls for a large amount of cable winding. This remarkably facilitates the speed change operation while enabling a ready braking operation, resulting is significantly improved riding safety.

In addition, since an amount of one reciprocal rotational operation of the cylindrical operation member 11 can be made small enough, the cross section of the cylindrical operation member 11 may not be limited to a circle, but a different cross section such as an oval or any other shape (including the provision of the finger engaging bulge) which best fits the cyclist's hand and fingers may be selected.

Figure 19:
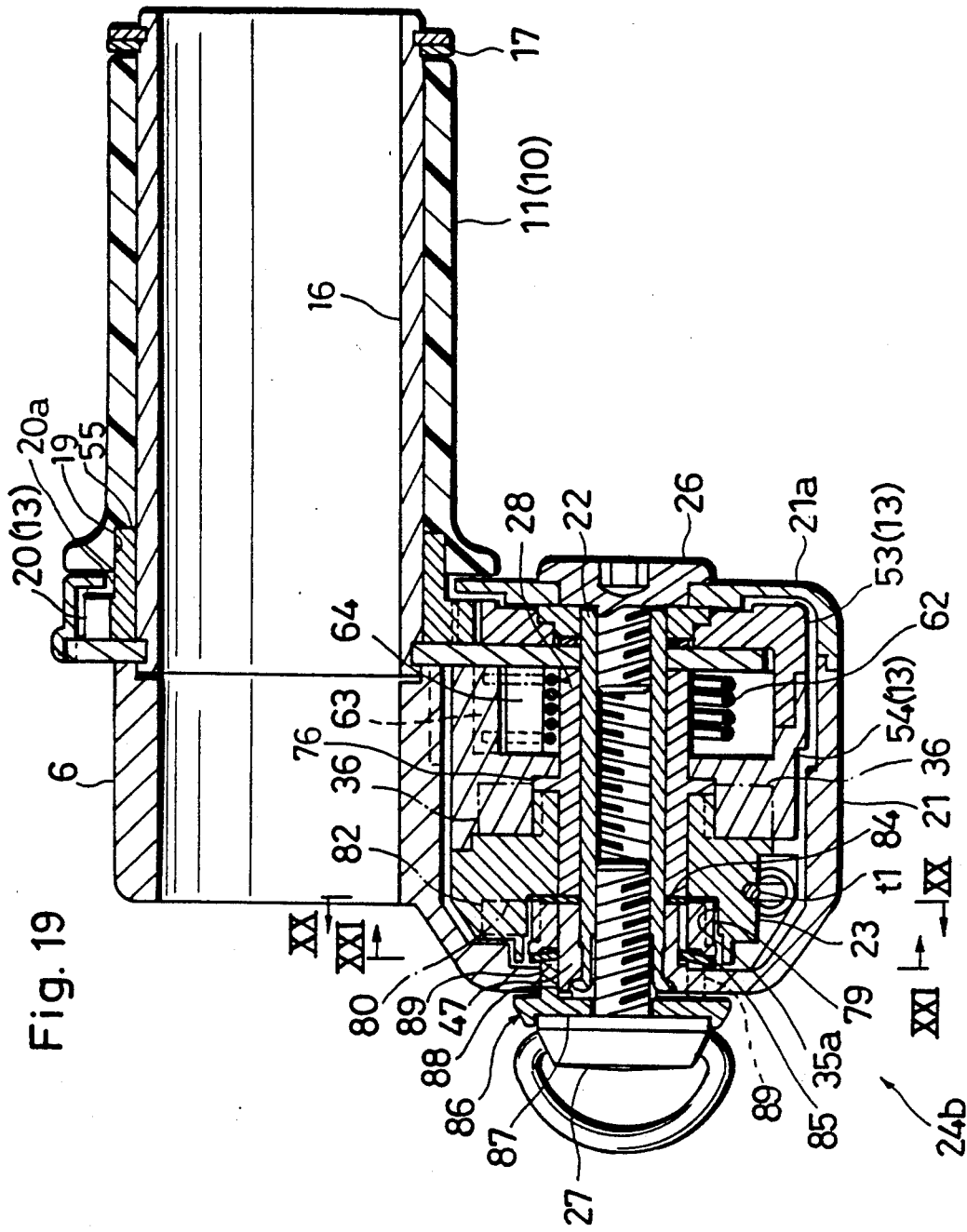
FIGS. 19 to 21 show a second embodiment of the present invention.
Figure 20:
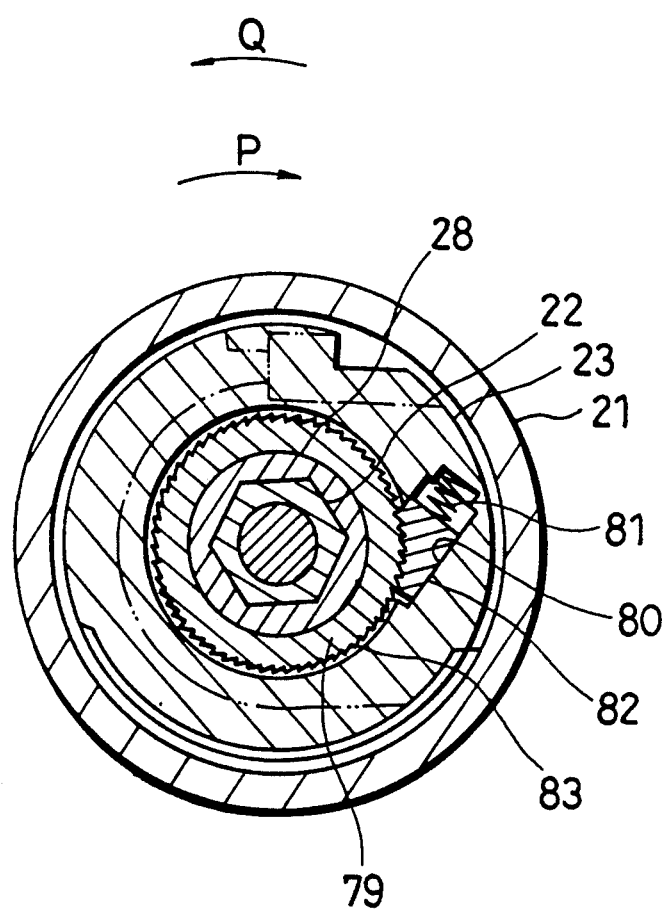
Figure 21:
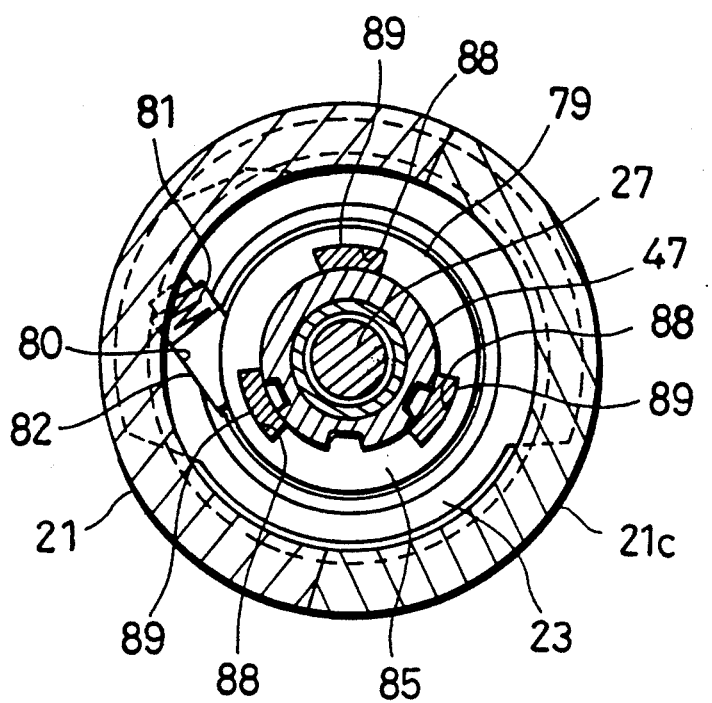

Turning now to FIGS. 19 through 21, there is shown a second embodiment of the present invention.

This embodiment makes use of what is known as a power ratchet mechanism 24b in place of the click mechanism 24a to serve as a retainer mechanism 24.

As shown in FIGS. 19 and 20 the power ratchet mechanism 24b includes a ratchet roller 79 fitted rotatably around an internal boss 47 of the cylindrical housing 21, and a ratchet pawl 82 mounted in a ratchet pawl housing hole 80 formed in the circumferential wall of the retainer mechanism housing space 35 of the cable reel member 23. The ratchet pawl 82 is elastically urged radially inward by a spring 81 and engages the ratchet roller 79.

This embodiment uses a friction plate 84 fitted on the shaft member 22 axially outwardly of the ratchet roller 79 and press-fixed between the shaft sleeve member 28 and the internal boss 47. Also, a discal washer 85 is mounted as a spring means axially inwardly of the ratchet roller 79. This washer is pressed against the ratchet roller 79 by a presser 86, thereby holding the ratchet roller 79 with a predetermined friction.

As shown in FIGS. 19 and 21 the presser 86 comprises a seat 87 to accommodate a head of a bolt 27 screwed into a center hole of the shaft member 22, and three pressing legs 89 extending axially from the seat 87 into the cylindrical housing 21 to press the washer 85. As each pressing leg 89 presses the inner edge of the washer 85, the outer edge of the washer 85 elastically contacts against the ratchet roller 79 to cause this ratchet roller 79 to be elastically clamped between the washer 85 and the friction plate 84 to generate a predetermined friction. The ratchet roller 79 and the ratchet pawls 82 are arranged to allow the cable reel 23 to rotate freely in a cable winding direction indicated by Arrow P in FIG. 21.

The ratchet roller 79 is elastically clamped between the washer 85 and the presser 86 under a predetermined frictional resistance against rotation. Therefore, if a pulling force applied by the derailleur to the speed control cable T is disregarded, the cable reel 23 can rotate virtually without friction in the direction of Arrow P, whereas it is accompanied by friction when it turns in the direction of Arrow Q.

In other words, the cable reel 23 can turn freely relative to the ratchet roller 79 when the cable reel 23 rotates in the direction of Arrow P, whereas when it rotates in the direction of Arrow Q, the ratchet teeth 83 engage the ratchet pawl 82 for causing the ratchet roller 79 under friction to rotate with the cable reel 23.

With the above-mentioned power ratchet mechanism 24b, it is now possible that when the cylindrical operation member 11 is reciprocally rotated to unwind the cable, the cable T will be under the influences of the above-mentioned friction and not be overly unwound by the pulling tension from the derailleur, allowing the cable reel 23 to turn according to the rotation of the cylindrical operation member 11 and to stay at an optional rotational position. On the other hand when the control cable T is wound, the ratchet roller 79 is free from the friction, so that the control cable T can be wound smoothly with a minimum force.

The scope of the present invention is not limited or confined to the embodiments so far described.

For example, instead of the click mechanism 24a or power ratchet mechanism 24b described above, such a retainer mechanism as used in an ordinary speed change operation assembly where the control cable is retained by friction may be used as well.

Further, the present invention is applicable to bicycles not only with a straight handlebar as exemplified in the embodiments but also with a drop type and other types of handlebars.

Apparently, the speed change operation assembly may be provided separately from the brake lever assembly 2.

Another variation includes that instead of the cylindrical operation member 11 constituting a part of the handle grip 10, the cylindrical operation member 11 may constitute an entire handle grip.

Still further, instead of rotatably supporting the cable reel 23 around the shaft member 22 which is spaced from the handlebar 2, the cable reel member 23 may be made to rotate about the axis of the handlebar 2.

I claim:

1. A bicycle speed change operation assembly comprising:
 a cylindrical operation member rotatably supported around a grip end portion of a handlebar,
 a speed change operation mechanism provided in proximity of said grip end portion of said handlebar and capable of winding and unwinding a speed control cable, and a transmission mechanism provided between said cylindrical operation member and said speed change operation mechanism for driving said speed change operation mechanism in response to the rotation of said cylindrical operation member;

wherein said cylindrical operation member is spring-urged toward a neutral rotational position which provides a commencing point at the time of rotating said cylindrical operation member; and wherein said speed change operation mechanism functions to wind or unwind said control cable in response to rotational reciprocation of said cylindrical operation member in one direction from a neutral rotational position.

2. The bicycle speed change operation assembly according to claim 1, wherein said speed change operation mechanism comprises:

a shaft member provided in proximity of said grip end portion; and a cable reel rotatably mounted around said shaft member and linked via said transmission mechanism with said cylindrical operation member;

said transmission mechanism functioning to rotate said cable reel with said cylindrical operation member at the time of rotating said cylindrical operation member in said cable winding or unwinding direction from said neutral position but to disconnect rotational coupling relation between said cylindrical operation member and said cable reel when said cylindrical operation member is rotated back to said neutral position.

3. The bicycle speed change operation assembly according to claim 1, wherein said cylindrical operation member has a finger engaging bulge projecting radially outward for engagement with a cyclist's finger.

4. The bicycle speed change operation assembly according to claim 1, further comprising an integral brake lever assembly.

5. The bicycle speed change operation assembly according to claim 1, wherein said cylindrical operation member constitutes a handle grip.

6. The bicycle speed change operation assembly according to claim 1, wherein said cylindrical operation member constitutes a handle grip together with a cylindrical grip member fitted around at an outermost portion of said handlebar.

7. The bicycle speed change operation assembly according to claim 2, wherein said shaft member is spaced from but held in parallel to an axis of said handlebar.

8. The bicycle speed change operation assembly according to claim 2, wherein said speed change operation mechanism includes a retainer mechanism for holding said cable reel at a predetermined or optional rotational position.

9. The bicycle speed change operation assembly according to claim 8, wherein said retainer mechanism includes a click mechanism capable of holding said cable reel at a selected one of stepwise rotational positions.

10. The bicycle speed change operation assembly according to claim 8, wherein said retainer mechanism includes a power ratchet mechanism capable of holding said cable reel at a selected one of stepwise rotational positions.

11. The bicycle speed change operation assembly according to claim 8, wherein said retainer mechanism is capable of holding said cable reel steplessly at an optional rotational position by friction.

* * * * *